(12) United States Patent
Honda

(10) Patent No.: US 6,487,044 B1
(45) Date of Patent: Nov. 26, 2002

(54) THIN-FILM MAGNETIC HEAD PROVIDED WITH LEADER SECTION COMPOSED OF GOOD CONDUCTOR EXTENDING FROM COIL TO TERMINAL REGION AND METHOD OF MAKING THE SAME

(75) Inventor: Kenji Honda, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/533,279

(22) Filed: Mar. 22, 2000

(30) Foreign Application Priority Data

Mar. 25, 1999 (JP) .......................................... 11-081270

(51) Int. Cl.[7] .............................................. G11B 5/60
(52) U.S. Cl. ................................................... 360/234.5
(58) Field of Search .............................. 360/234.5, 235, 360/236.3

(56) References Cited

U.S. PATENT DOCUMENTS

| | | | |
|---|---|---|---|
| 4,856,181 A | 8/1989 | Pichler et al. ............ 29/603.14 |
| 4,949,209 A | 8/1990 | Imanaka et al. ............. 360/126 |
| 5,001,591 A | 3/1991 | Nakashima ................. 360/126 |
| 5,200,869 A * | 4/1993 | Matsuzaki .................... 360/103 |
| 5,293,288 A * | 3/1994 | Ishikawa et al. ............. 360/103 |
| 5,296,982 A * | 3/1994 | Terada et al. ................ 360/103 |
| 5,326,429 A | 7/1994 | Cohen et al. .................. 216/22 |
| 5,820,770 A | 10/1998 | Cohen et al. .................. 216/22 |
| 5,894,380 A * | 4/1999 | Sasada et al. ................ 360/103 |
| 5,900,324 A * | 5/1999 | Moroishi et al. | |
| 5,901,014 A * | 5/1999 | Hiraoka et al. ............. 360/104 |
| 5,907,459 A * | 5/1999 | Shouji et al. ................ 360/113 |

FOREIGN PATENT DOCUMENTS

| | | |
|---|---|---|
| JP | 3-20021 | 2/1991 |
| JP | 5-314448 | 11/1993 |

* cited by examiner

*Primary Examiner*—Allen Cao
*Assistant Examiner*—Dzung C. Nguyen
(74) *Attorney, Agent, or Firm*—Brinks Hofer Gilson & Lione

(57) ABSTRACT

A thin-film magnetic head includes a lower core composed of a magnetic material provided on a slider, a first insulating layer formed on the lower core, a spiral coil composed of a good conductor formed on the first insulating layer, a first leader section composed of a good conductor formed on the slider, the first leader section being connected to an end of the coil and extending to a terminal region provided on the slider, a second insulating layer formed on the first insulating layer so as to cover the coil, and an upper core composed of a magnetic material formed on the second insulating layer, the upper core being in contact with the lower core at the center of the coil. A protective magnetic film is formed on the surface of the first leader section.

16 Claims, 22 Drawing Sheets

THIN-FILM MAGNETIC HEAD PROVIDED WITH LEADER SECTION COMPOSED OF GOOD CONDUCTOR EXTENDING FROM COIL TO TERMINAL REGION AND METHOD OF MAKING THE SAME

BACKGROUND OF THE INVENTION

1. Field of the Invention

The present invention relates to thin-film magnetic heads used for magneto-optical disk units, hard magnetic disk drives, etc. and to a method of making the same.

2. Description of the Related Art

A conventional thin-film magnetic head will be described with reference to FIGS. 15 to 18.

FIG. 15 is a plan view of a side 2a of a slider 2 (see FIG. 16) provided with a head element 1 of a thin-film magnetic head. The slider 2 is composed of a ceramic such as $Al_2O_3$—TiC, and an underlying layer 2b composed of $Al_2O_3$ or the like is formed at the side 2a. The side 2a of the slider 2 includes a head region A1, terminal regions A3 for supplying power to the head element 1, and a leader-section region A2 for connecting the head element 1 to a first terminal 19a and a second terminal 19b. The head element 1 lies in the head region A1, and includes a read section h1 1for reading data from hard magnetic disks and a write section h2 for writing data.

FIG. 16 is a perspective view of the head element 1 and FIG. 17 is a portion of a sectional view taken along the line 17—17 of FIG. 15. As shown in FIGS. 16 and 17, the read section h1 includes a lower shielding layer 3 composed of a magnetic material such as a permalloy formed on the underlying layer 2b at the side 2a, a lower gap layer 4 composed of an insulating material such as $Al_2O_3$ formed on the lower shielding layer 3, a magnetoresistive element layer 5 formed on the end of the lower gap layer 4 facing a medium, a hard bias layer 6 connected to both sides of the magnetoresistive element layer 5, an electrode layer 7 composed of a good conductor which is connected to the hard bias layer 6 and extends to the surface of the lower gap layer 4, an upper gap layer 8 composed of an insulating material such as alumina formed above the lower shielding layer 3 for covering the magnetoresistive element layer 5, the hard bias layer 6, and the electrode layer 7, and an upper shielding layer which also acts as a lower core 9 composed of a magnetic material formed on the upper gap layer 8.

The write section h2 of the head element 1 includes the lower core 9 composed of a magnetic material such as a permalloy, a gap layer 11 composed of an insulating material such as alumina formed on the lower core 9, a first insulating layer 12 composed of an insulating organic material formed on the gap layer 11, a window 10 provided so that a portion of the lower core 9 is exposed through the first insulating layer 12, a coil 13 composed of a good conductor such as copper spirally wound around the window 10 in the first insulating layer 12, an end 13a of the coil 13 extending from the surface of the first insulating layer 12 to the surface of the side 2a of the slider 2, a nickel film 14 formed on the coil 13 and the end 13a for inhibiting oxidation, a second insulating layer 15 composed of an insulating organic material for covering the surface of the coil 13 coated with the nickel film 14, an opening (not shown in the drawing) provided so that the other end (not shown in the drawing) of the coil 13 is exposed through the second insulating layer 15, and an upper core 16 composed of a magnetic material such as a FeNi alloy (permalloy) formed on the surface of the second insulating layer 15 and connected to the lower core 9 through the window 10.

The upper core 16 is opposed to the lower core 9 with the gap layer 11 therebetween at the end of the head element 1 facing the medium, and the width of the tip of the upper core 16 is narrowed at this end.

FIG. 18 is a portion of a sectional view taken along the line 18—18 of FIG. 15. As shown in FIGS. 15 and 18, a first leader section 18a, which extends from the end 13a of the coil 13 to the terminal region A3, is formed in the leader-section region A2. The first leader section 18a, which is composed of the same material as that of the upper core 16, overlaps the end 13a of the coil 13 in the head region A1 and extends to the terminal region A3. The end of the first leader section 18a constitutes a first terminal 19a formed in the terminal region A3.

A second leader section 18b, which extends from the other end (not shown in the drawing) of the coil 13 to the terminal region A3, is formed in the leader-section region A2. The second leader section 18b, which is composed of the same magnetic material as that of the upper core 16, is connected to the other end of the coil 13 and extends to the terminal region A3. The end of the second leader section 18b constitutes a second terminal 19b formed in the terminal region A3.

The slider 2 is mounted on a flexure (not shown in the drawing) which is flexible so that the side 2a is perpendicular to the surface of the medium, such as a hard magnetic disk.

When the hard magnetic disk drive is operated, a current is applied to the coil 13 from the first and second terminals 19a and 19b through the first and second leader sections 18a and 18b, respectively. Magnetic fields, which are induced by the current flowing through the coil 13, in the upper core 16 and the lower core 9, form a magnetic path at a gap G. Data is written on to the medium by a magnetic field of the magnetic path passing through the medium.

Next, a method of fabricating the coil 13, the upper core 16, and the first and second leader sections 18a and 18b will be described with reference to FIGS. 19 to 27.

The read section h1 is formed on the underlying layer 2b composed of $Al_2O_3$ or the like at the side 2a of the slider 2, and the gap layer 11 and the first insulating layer 12 are patterned on the lower core 9, which also acts as an upper shielding layer of the read section h1, so that a portion of the lower core 9 is exposed at the window 10.

In such a state, first, as shown in FIG. 19, an underlying layer 22 composed of a thin metal film for preparing plating is formed by sputtering over the first insulating layer 12 and the underlying layer 2b. An outline of the coil 13 is formed by a resist frame 23 on the surface of the underlying layer 22.

In the coil-forming step, a copper plating film 24 is formed on the underlying layer 22 provided with the resist frame 23, and a nickel plating film 25 for inhibiting oxidation of the copper is deposited thereon.

After the resist frame 23 is removed by a resist stripper, in a first ion milling step shown in FIG. 20, the surface of the nickel plating film 25 which covers the copper plating film 24 and the surface of a removable underlying layer 22a, which has been exposed by the resist-stripping, are irradiated with Ar ions, and the removable underlying layer 22a is eliminated so that insulating spaces are formed between turns of the coil 13.

Next, unnecessary copper plating film 24 and nickel plating film 25 are removed by wet etching while the surface of the nickel plating film 25 constituting the coil 13 is protected with a resist, and then the resist is stripped.

In a second ion milling step shown in FIG. 21, the surface of the nickel plating film 14 which covers the coil 13 and the surface of an unnecessary underlying layer 22b exposed by the wet etching are irradiated with Ar ions, and the exposed unnecessary underlying layer 22b is eliminated.

When the coil 13 is completed, as shown in FIG. 22, the end 13a of the coil 13 is formed in the head region A1.

In a subsequent step for forming the second insulating layer, an organic film is applied on the side 2a of the slider 2 in which the coil 13 has been formed, and the second insulating layer 15 is formed above the first insulating layer 12 so as to cover the coil 13. At this stage, the second insulating layer 15 is patterned so that the end 13a of the coil 13 and the other end are exposed.

Next, as shown in FIG. 23, an underlying layer 27 which is a thin metal film for plating is formed by sputtering on the second insulating layer 15, the end 13a of the coil 13, and the underlying layer 2b composed of $Al_2O_3$ or the like at the side 2a.

An outline of the upper core 16, an integrated outline of the first leader section 18a which overlaps the end 13a of the coil 13 and the first terminal 19a, and, although not shown in FIG. 23, an integrated outline of a joint for connecting to other end of the coil 13, the second leader section 18b, and the second terminal 19b, are formed on the underlying layer 27 using a resist frame 28.

Next, in a step for integrally forming the upper core and the leader section, a FeNi alloy (permalloy) plating film 29 is formed on the underlying layer 27 provided with the resist frame 28.

The resist frame 28 is then removed by a resist stripper, and in a third ion milling step shown in FIG. 24, the surface of an exposed underlying layer 27a exposed by the removal of the resist frame 28 and the surface of the permalloy plating film 29 are irradiated with Ar ions, and the exposed underlying layer 27a is eliminated.

As shown in FIG. 25, the surface of the permalloy plating film 29 in the portions for forming leader sections, terminals, and a joint 20 is protected by a protective resist 30.

Next, in an upper core wet etching step, the unnecessary permalloy plating film 29 is removed by wet etching, and thus, the upper core 16, the leader sections 18a and 18b, the terminals 19a and 19b, and the joint 20 are formed.

After the protective resist 30 is stripped, in a fourth ion milling step shown in FIG. 26, the surfaces of the upper core 16, the leader sections 18a and 18b, and the terminals 19a and 19b, and the surface of an unnecessary underlying layer 27b exposed by the second wet etching are irradiated with Ar ions, and the unnecessary underlying layer 27b is eliminated.

FIG. 27 shows a structure in which the coil 13, the upper core 16, the first and second leader sections 18a and 18b, and the first and second terminals 19a and 19b are completed.

In the conventional thin-film magnetic head, since the first leader section 18a extending from the end 13a of the coil 13 to the terminal region A3 and the upper core 16 are composed of the same magnetic material, the first leader section 18a has a high wiring resistance, thus increasing power consumption.

Since the second leader section 18b extending from the other end of the coil 13 to the terminal region A3 and the upper core 16 are also composed of the same magnetic material, the second leader section 18b has a high wiring resistance, thus increasing power consumption.

In view of the conductivity of the leader sections 18a and 18b, a permalloy composed of a FeNi alloy having a low resistivity is used as the material for the upper core 16, which is the same material as that for the first and second leader sections 18a and 18b. Thereby, an eddy current induced by an alternating current of the coil 13 easily flows through the upper core 16, and a current is consumed by the eddy current, thus increasing power consumption.

SUMMARY OF THE INVENTION

It is an object of the present invention to provide a thin-film magnetic head in which wiring resistance is decreased, resulting in low power consumption. It is another object of the present invention to provide a thin-film magnetic head in which the eddy current loss is reduced, resulting in low power consumption. It is another object of the present invention to provide a method of producing such thin-film magnetic heads.

In one aspect, a thin-film magnetic head in accordance with the present invention includes a magnetic lower core provided on a slider, a first insulating layer formed on the lower core, a spiral coil composed of a good conductor formed on the first insulating layer, a first leader section composed of a good conductor formed on the slider, the first leader section being connected to an end of the coil and extending to a terminal region provided on the slider, a second insulating layer formed on the first insulating layer so as to cover the coil, and a magnetic upper core formed on the second insulating layer, the upper core being in contact with the lower core at the center of the coil. A first protective magnetic film is formed on the surface of the first leader section.

The thin-film magnetic head may further include a second leader section composed of a good conductor extending from the vicinity of the coil to the terminal region provided on the slider, and a second protective magnetic film for covering the surface of the second leader section, the second protective magnetic film being connected to the other end of the coil exposed through the second insulating layer.

Preferably, the upper core and the magnetic film formed on the surface of the leader section are composed of an alloy containing at least one element selected from the group consisting of Fe, Co, and Ni.

In another aspect, a thin-film magnetic head in accordance with the present invention includes a magnetic lower core provided on a slider, a first insulating layer formed on the lower core, a spiral coil formed on the first insulating layer, a leader section composed of a good conductor formed on the slider, the leader section being adjacent to the coil and extending to a terminal region provided on the slider, a second insulating layer formed on the first insulating layer so as to cover the coil, and a magnetic upper core formed on the second insulating layer, the upper core being in contact with the lower core at the center of the coil. A protective magnetic film, which is connected to the coil, is formed to cover the surface of the leader section.

Preferably, the upper core and the protective magnetic film formed on the surface of the leader section are composed of an alloy containing at least one element selected from the group consisting of Fe, Co, and Ni.

In another aspect, a method of producing a thin-film magnetic head in accordance with the present invention includes a first-insulating-layer-forming step for forming a first insulating layer on a magnetic lower core; a coil-and-leader-section-forming step for simultaneously forming a coil and a leader section connected to the coil and extending to a terminal region provided on the slider and/or a leader section extending from the vicinity of the coil to the terminal region provided on the slider using the same good conductor; a second-insulating-layer-forming step for forming a second insulating layer on the slider so as to cover the coil; and an upper-core-and-protective-film-forming step for simultaneously forming a protective magnetic film on the surface of the leader section and an upper core on the second insulating layer using the same magnetic material.

In the method of producing the thin-film magnetic head, preferably, the upper core and the protective magnetic film formed on the surface of the leader section are composed of an alloy containing at least one element selected from the group consisting of Fe, Co, and Ni.

DESCRIPTION OF THE PREFERRED EMBODIMENTS

A thin-film magnetic head of the present invention will be described with reference to FIGS. 1 to 4.

Figure 1:
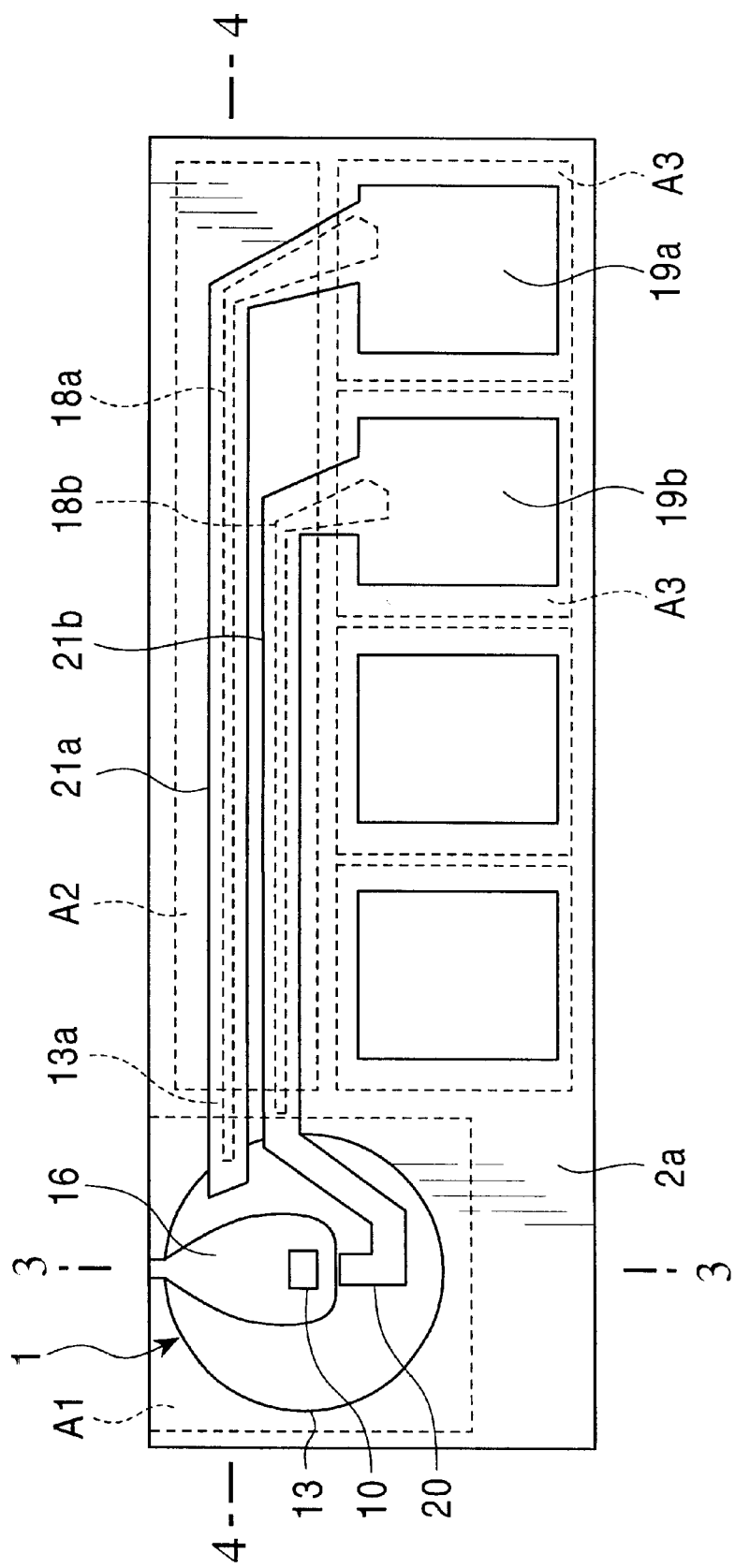
FIG. 1 is a plan view of a side of a slider provided with a thin-film magnetic head of the present invention.

FIG. 1 is a plan view of a side 2a of a slider 2 (see FIG. 2) provided with a head element 1. The slider 2 is composed of a ceramic such as $Al_2O_3$—TiC, and an underlying layer 2b composed of $Al_2O_3$ or the like is formed at the side 2a. The side 2a of the slider 2 includes a head region A1, terminal regions A3 for supplying power to the head element 1, and a leader-section region A2 for connecting the head element 1 to a first terminal 19a and a second terminal 19b. The head element 1 lies in the head region A1, and includes a read section h1 for reading the data from hard magnetic disks and a write section h2 for writing data.

Figure 2:
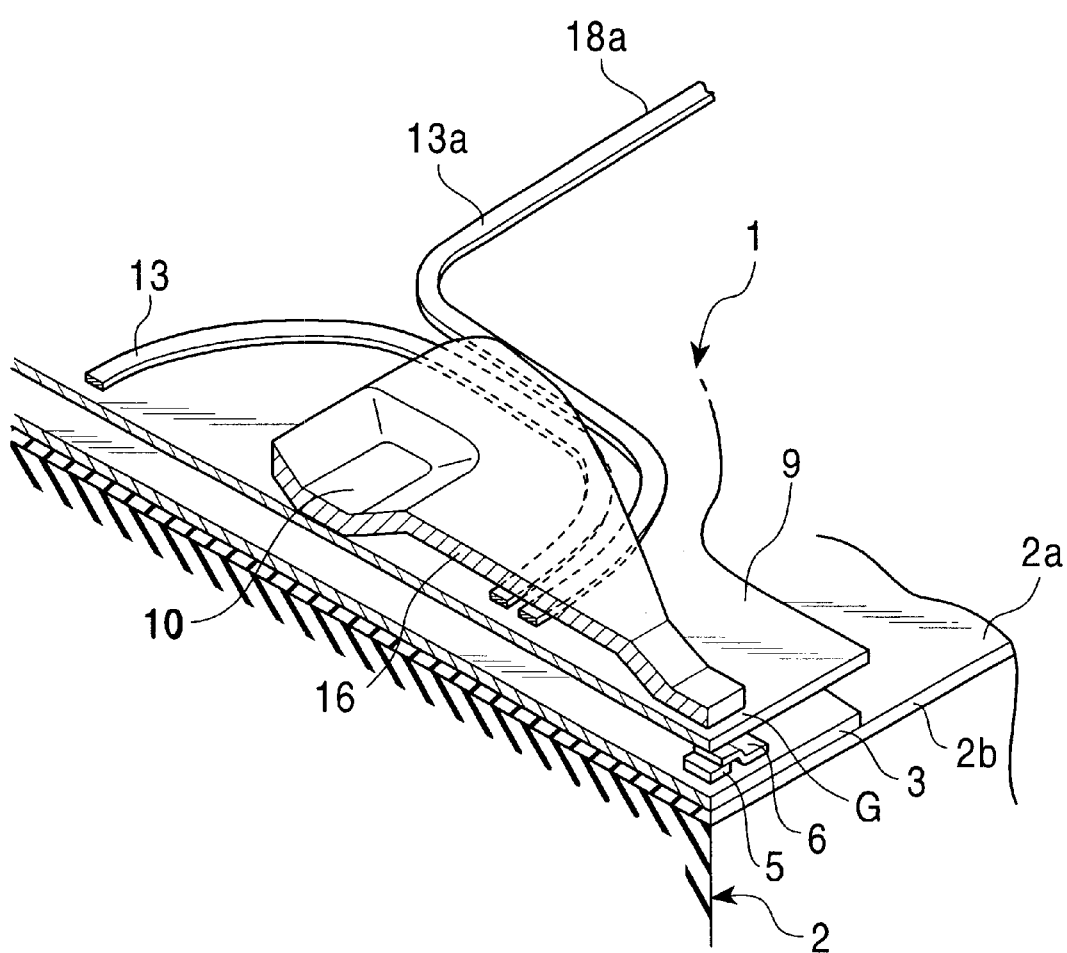
FIG. 2 is a perspective view of a head element of the thin-film magnetic head of the present invention.
Figure 3:
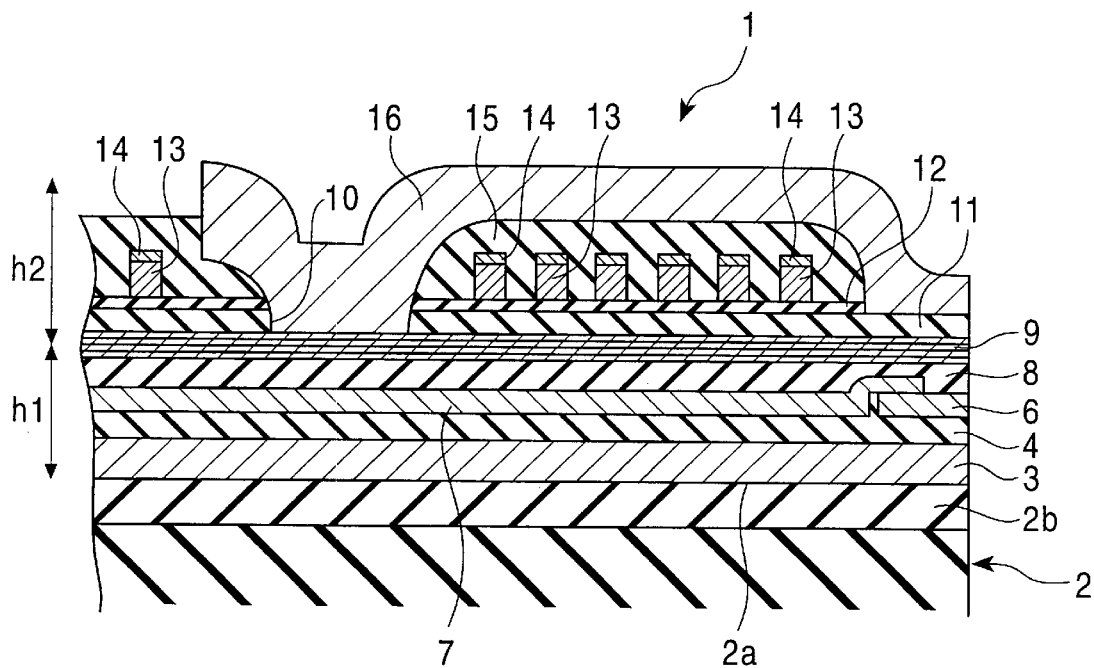
FIG. 3 is a portion of a sectional view taken along the line 3—3 of FIG. 1.

FIG. 2 is a perspective view of the head element 1 and FIG. 3 is a portion of a sectional view taken along the line 3—3 of FIG. 1. The read section hi includes a lower shielding layer 3 composed of a magnetic material such as a permalloy formed on the underlying layer 2b at the side 2a, a lower gap layer 4 composed of an insulating material such as alumina formed on the lower shielding layer 3, a magnetoresistive element layer 5 formed on the end of the lower gap layer 4 facing a medium, a hard bias layer 6 connected to both sides of the magnetoresistive element layer 5, an electrode layer 7 composed of a good conductor which is connected to the hard bias layer 6 and extends to the surface of the lower gap layer 4, an upper gap layer 8 composed of an insulating material such as alumina formed above the lower shielding layer 3 for covering the magnetoresistive element layer 5, the hard bias layer 6, and the electrode layer 7, and an upper shielding layer which also acts as a lower core 9 composed of a magnetic material formed on the upper gap layer 8.

The write section h2 of the head element 1 includes the lower core 9 composed of a magnetic material such as a permalloy, a gap layer 11 composed of an insulating material such as alumina formed on the lower core 9, a first insulating layer 12 composed of an insulating organic material formed on the gap layer 11, a window 10 provided so that a portion of the lower core 9 is exposed through the first insulating layer 12, a coil 13 composed of a good conductor such as copper spirally wound around the window 10 in the first insulating layer 12, an end 13a of the coil 13 extending from the surface of the first insulating layer 12 to the surface of the side 2a of the slider 2, a nickel film 14 formed on the coil 13 and the end 13a for inhibiting oxidation, a second insulating layer 15 composed of an insulating organic material for covering the surface of the coil 13 coated with the nickel film 14, an opening (not shown in the drawing) provided so that the other end (not shown in the drawing) of the coil 13 is exposed through the second insulating layer 15, and an upper core 16 composed of a magnetic material such as a FeNi alloy (permalloy) formed on the surface of the second insulating layer 15 and connected to the lower core 9 through the window 10.

The upper core 16 is preferably composed of a magnetic material having a high saturation magnetic flux density. Examples of such a material include FeNi alloys, CoFeNi alloys, CoNi alloys, and CoFe alloys. Alternatively, a magnetic alloy having a high resistivity in which the resistivity is increased by incorporating an inorganic additive or an organic additive in the above magnetic material may be used. In such a case, the eddy current loss is decreased, and thus high-frequency recording is enabled. The upper core 16 is opposed to the lower core 9 with the gap layer 11 therebetween at the end of the head element 1 facing the medium, and the width of the tip of the upper core 16 is narrowed at this end.

Figure 4:
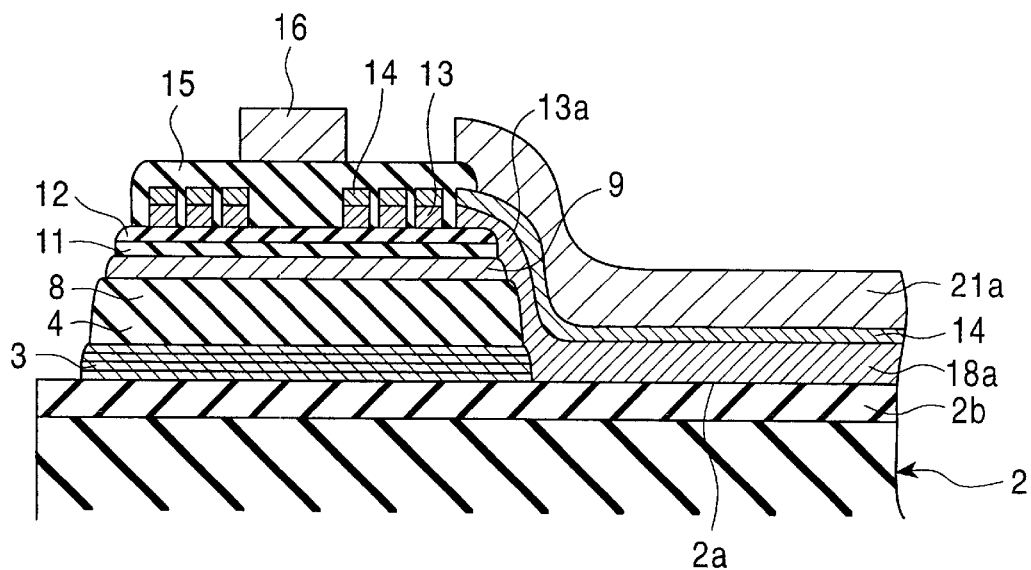
FIG. 4 is a portion of a sectional view taken along the line 4—4 of FIG. 1.

FIG. 4 is a portion of a sectional view taken along the line 4—4 of FIG. 1. As shown in FIGS. 1 and 4, in the leader-section region A2, a first leader section 18a which extends from the end 13a of the coil 13 to the terminal region A3 and a second leader section 18b which extends from the other end (not shown in the drawing) of the coil 13 to the terminal region A3 are formed.

The first leader section 18a electrically connected to the coil 13 is integrated with the coil 13 composed of a good conductor such as copper, and extends from the end 13a to the terminal region A3. The surface of the first leader section 18a is covered by a first protective film 21a, and an end of the first protective film 21a constitutes the first terminal 19a. The first protective film 21a and the first terminal 19a are composed of the same magnetic material as that for the upper core 16.

The second leader section 18b electrically connected to the coil 13 is composed of the same good conductor as that for the coil 13, and extends from the vicinity of the coil 13 to the terminal region A3. The surface of the second leader section 18b is covered by a second protective film 21b, and an end 20 of the second protective film 21b is connected to the other end of the coil 13. The other end of the coil 13 and the second leader section 18b are connected to each other through the second protective film 21b. The other end of the second protective film 21b constitutes the second terminal 19b. The second protective film 21b and the second terminal 19b are composed of the same magnetic material as that for the upper core 16.

The slider 2 is mounted on a flexure (not shown in the drawing) which is flexible so that the side 2a is perpendicular to the surface of the medium, such as a hard magnetic disk.

When the hard magnetic disk drive is operated, a current is applied to the coil 13 from the first and second terminals 19a and 19b through the first and second leader sections 18a and 18b, respectively, and the second protective film 21b which connects the second leader section 18b to the other end of the coil 13. At this stage, since the current mostly passes through the leader sections 18a and 18b composed of a good conductor such as copper to the coil 13, the current easily flows.

Magnetic fields, which are induced by the current flowing through the coil 13, in the upper core 16 and the lower core 9 form a magnetic path at a gap G. Data is written on to the medium by a magnetic field of the magnetic path passing through the medium.

Since an alternating current flows through the coil 13, an AC magnetic field is induced in the upper core 16, and an eddy current is generated by the AC magnetic field. However, the upper core 16 is composed of a FeNi alloy (permalloy) having a high resistivity in which the Fe content is higher than the Ni content, and thus the eddy current does not easily occur.

Next, a method of fabricating the coil 13, the upper core 16, the leader sections 18a and 18b, and the protective films 21a and 21b will be described with reference to FIGS. 5 to 14.

Figure 5:
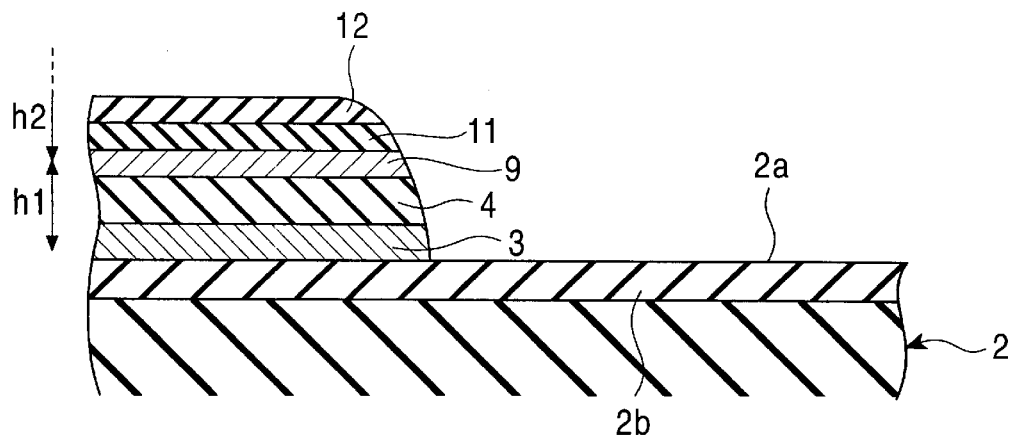
FIG. 5 is a schematic diagram which shows a method of producing the thin-film magnetic head of the present invention.

As shown in FIG. 5, the read section h1 is formed on the underlying layer 2b composed of $Al_2O_3$ or the like at the side 2a of the slider 2, and the gap layer 11 and the first insulating layer 12 are deposited on the lower core 9 which also acts as an upper shielding layer of the read section h1.

Figure 6:
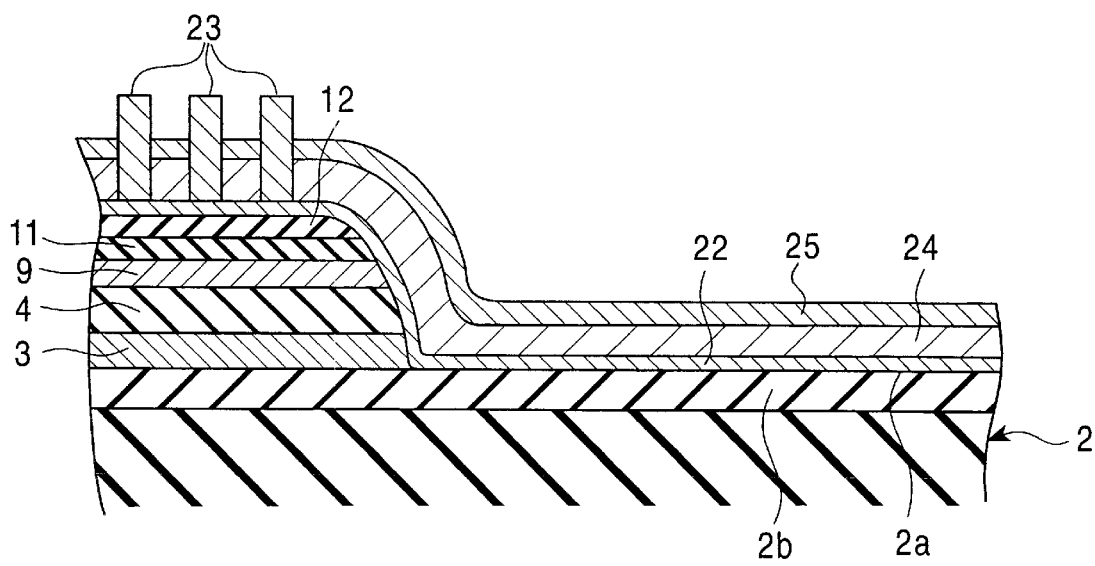
FIG. 6 is a schematic diagram which shows a method of producing the thin-film magnetic head of the present invention.

As shown in FIG. 6, an underlying layer 22 composed of a thin metal film for preparing plating is formed by sputtering over the first insulating layer 12 and the underlying layer 2b. An outline of the coil 13 and the first leader section 18a which is integrally formed with the coil 13 and an outline of the second leader section 18b are formed by a resist frame 23 on the surface of the underlying layer 22.

Next, in a step for integrally forming the coil and the leader-section, a copper plating film 24 is formed on the underlying layer 22 provided with the resist frame 23, and a nickel plating film 25 for inhibiting oxidation of copper is deposited thereon.

Figure 7:
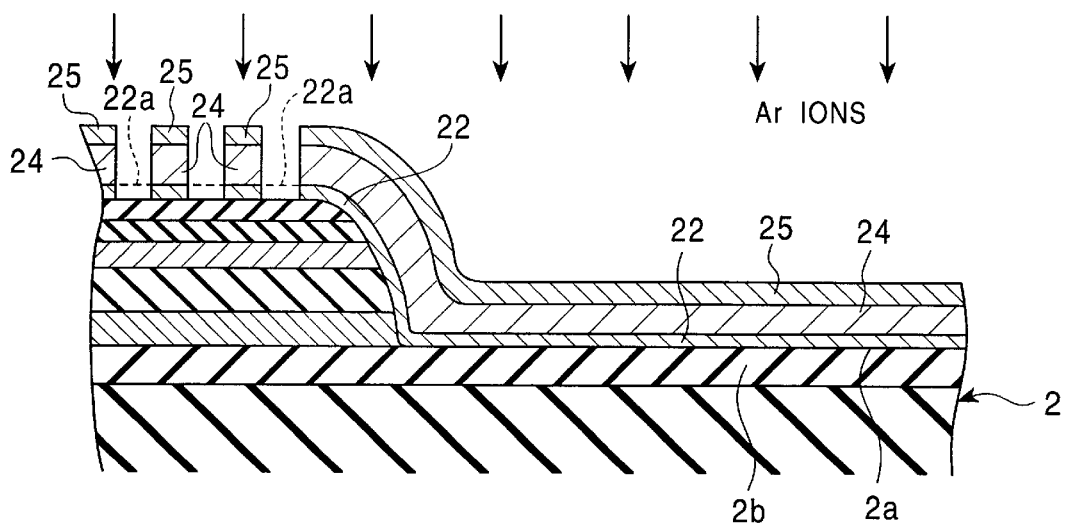
FIG. 7 is a schematic diagram which shows a method of producing the thin-film magnetic head of the present invention.

After the resist frame 23 is removed by a resist stripper, in a first ion milling step shown in FIG. 7, the surface of the nickel plating film 25 which covers the copper plating film 24 and the surface of an exposed underlying layer 22a which has been exposed by the resist-stripping are irradiated with Ar ions, and the exposed underlying layer 22a is eliminated. Consequently, insulating spaces between turns of the coil 13 and an insulating space between the first leader section 18a and the second leader section 18b are formed.

In a subsequent wet etching step, the unnecessary copper plating film 24 and the unnecessary nickel plating film 25 are removed by wet etching while the surface of the nickel plating film 25 which corresponds to the coil 13 and the leader sections 18a and 18b is protected by a resist, and then the resist which covers the portion corresponding to the coil 13 and the leader sections 18a and 18b is stripped.

Figure 8:
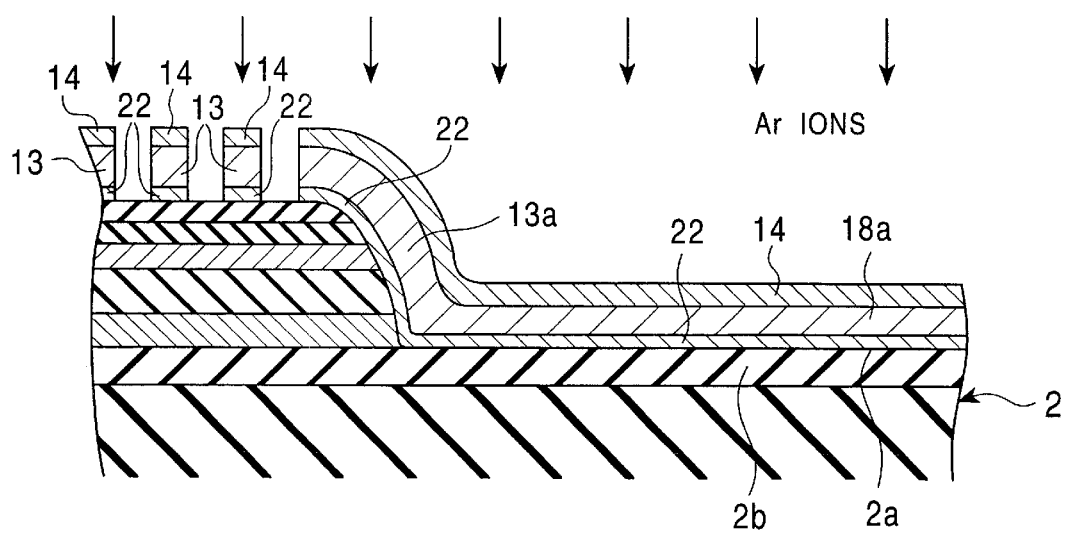
FIG. 8 is a schematic diagram which shows a method of producing the thin-film magnetic head of the present invention.

In a second ion milling step shown in FIG. 8, the surface of the nickel plating film 14 covering the coil 13 and the surface of an underlying layer exposed by the wet etching (not shown in FIG. 8) are irradiated with Ar ions, and the exposed underlying layer is eliminated.

Figure 9:
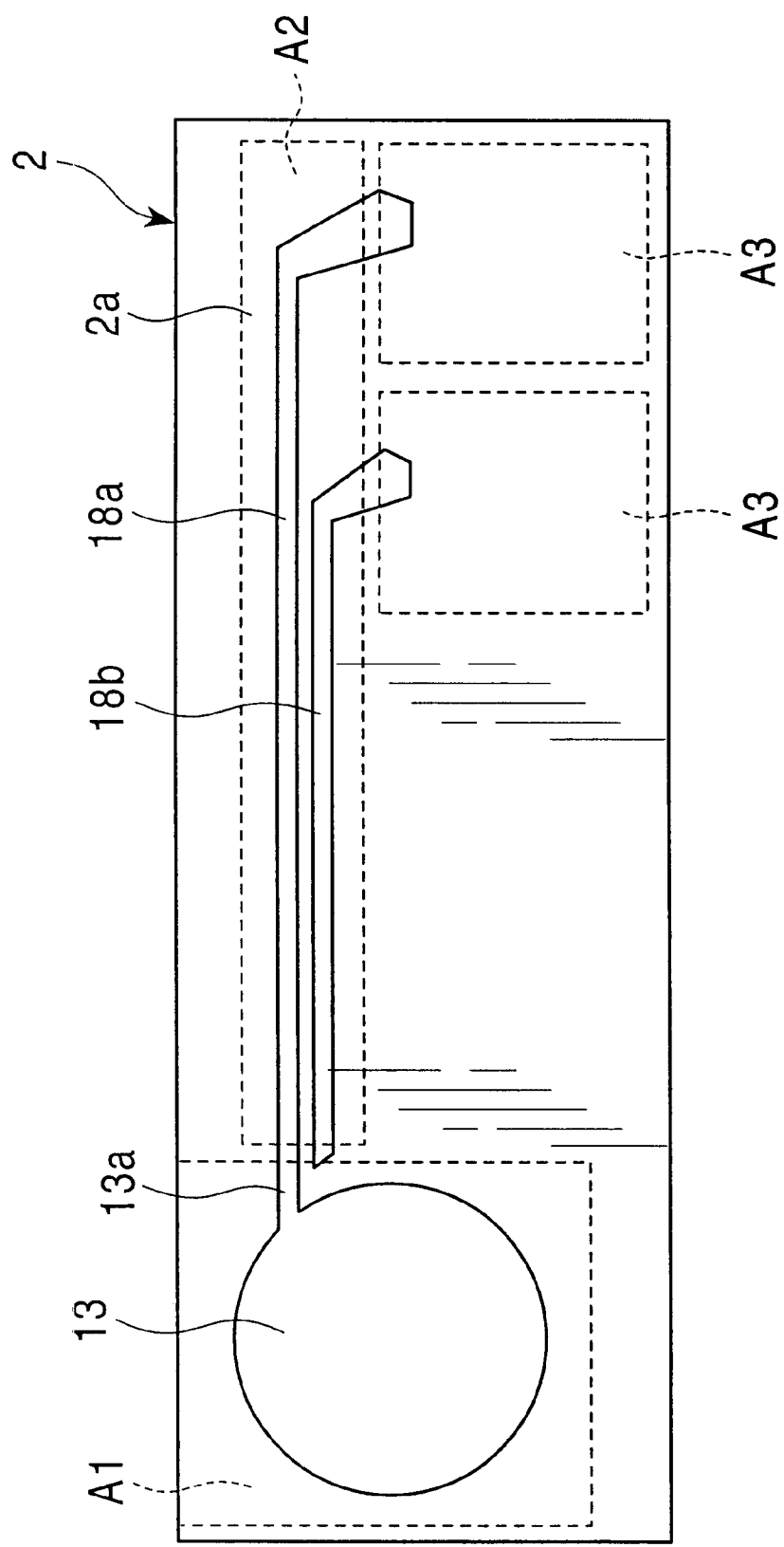
FIG. 9 is a schematic diagram which shows a method of producing the thin-film magnetic head of the present invention.

When the coil 13 and the leader sections 18a and 18b are completed, as shown in FIG. 9, the side 2a of the slider 2 is provided with the coil 13 formed in the head region A1, the first leader section 18a which has been integrally formed with the coil 13 and extends from the end 13a to the terminal region A3, and the second leader section 18b which extends from the vicinity of the coil to the terminal region A3.

In a step for forming the second insulating layer 15, by applying an organic film on the side 2a provided with the coil 13, the second insulating layer 15 is formed on the first insulating film 12 so as to cover the coil 13. At this stage, the second insulating layer 15 is patterned so that the other end of the coil 13 is exposed.

Figure 10:
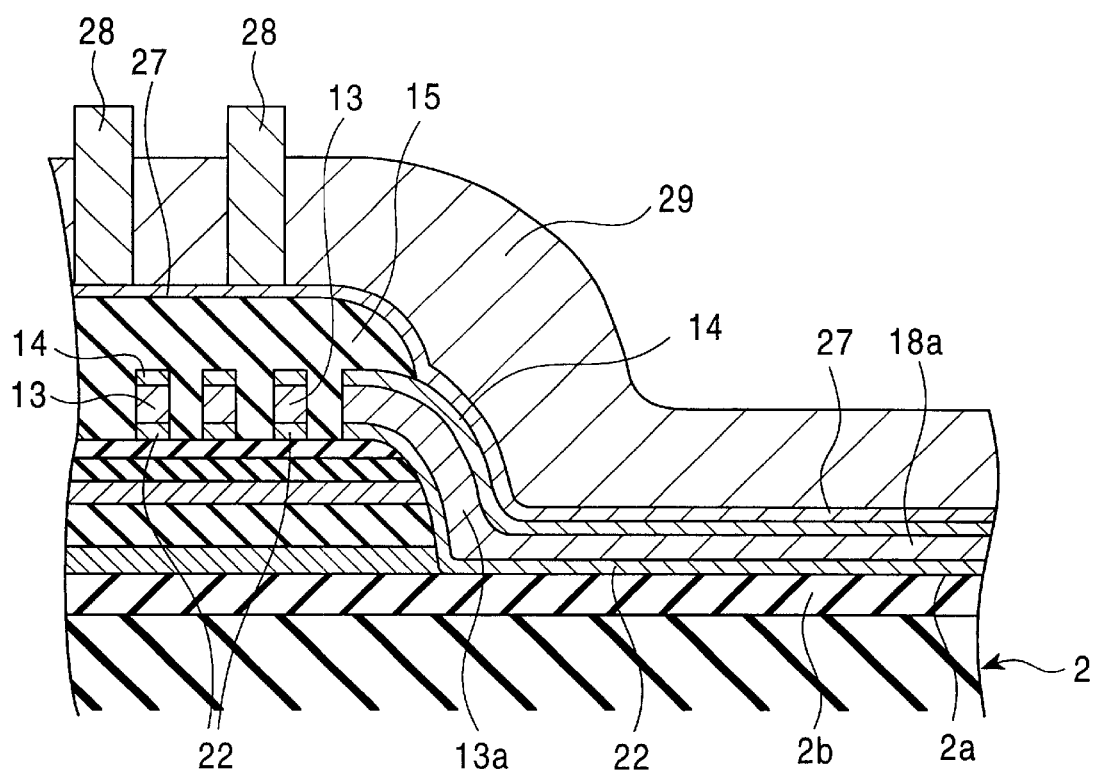
FIG. 10 is a schematic diagram which shows a method of producing the thin-film magnetic head of the present invention.

Next, as shown in FIG. 10, an underlying layer 27 which is a thin metal film for plating is formed by sputtering on the second insulating layer 15, the end 13a of the coil 13 covered with the nickel plating film 14, the first leader section 18a integrally formed with the end 13a, and, although not shown in FIG. 10, on the second leader section 18b and the side 2a of the slider 2.

An outline of the upper core 16, an integrated outline of the first protective film 21a, which covers the first leader section 18a, and the terminal 19a, and, although not shown in FIG. 10, an integrated outline of the second protective film 21b, which covers a joint 20 connecting the other end of the coil 13 and the second leader section 18b, and the second terminal 19b are formed on the underlying layer 27 using a resist frame 28.

Next, in a step for integrally forming the upper core and the protective film, after a FeNi alloy (permalloy) plating film 29, in which the Fe content is higher than the Ni content, is formed on the underlying layer 27 provided with the resist frame 28, the resist frame 28 is removed by a resist stripper.

Figure 11:
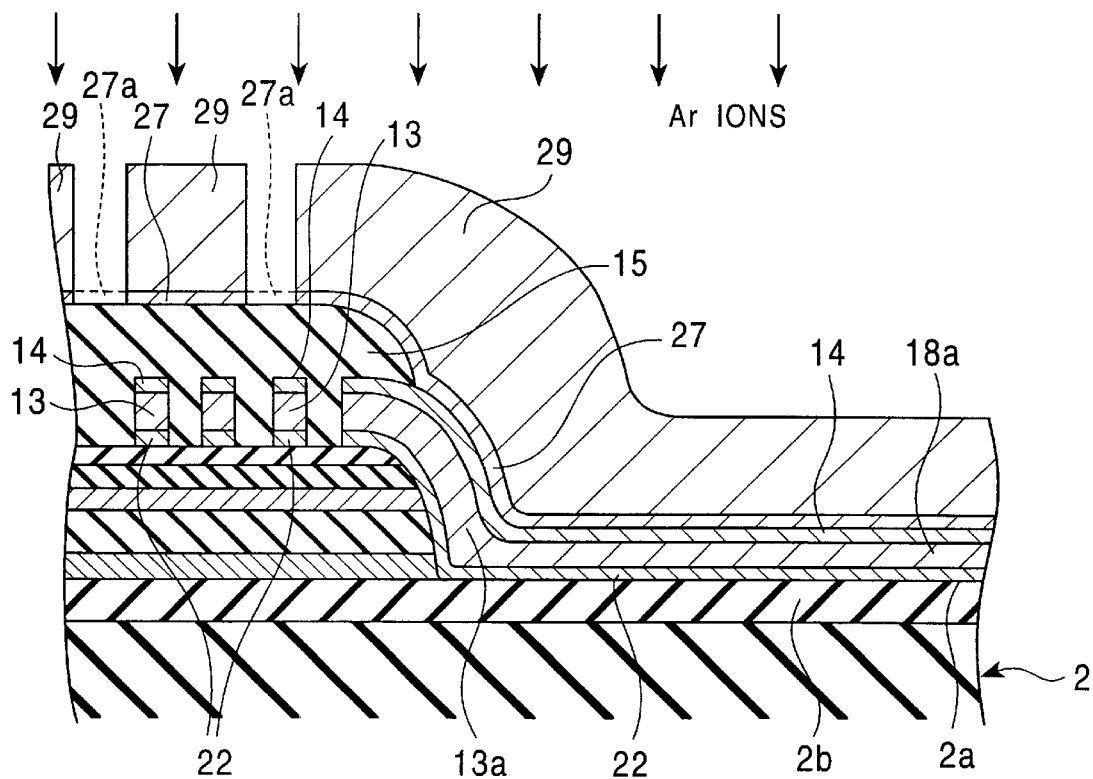
FIG. 11 is a schematic diagram which shows a method of producing the thin-film magnetic head of the present invention.

In a third ion milling step shown in FIG. 11, the surface of an exposed underlying layer 27a exposed by the removal of the resist frame 28 and the surface of the permalloy plating film 29 are irradiated with Ar ions, the exposed underlying layer 27a is eliminated, and an insulating space is formed between the first leader section 18a and the second leader section 18b. In the third ion milling step which is performed after the permalloy plating film 29 is formed, since the leader sections 18a and 18b are covered with the permalloy plating film 29, the leader sections 18a and 18b are not eliminated.

Figure 12:
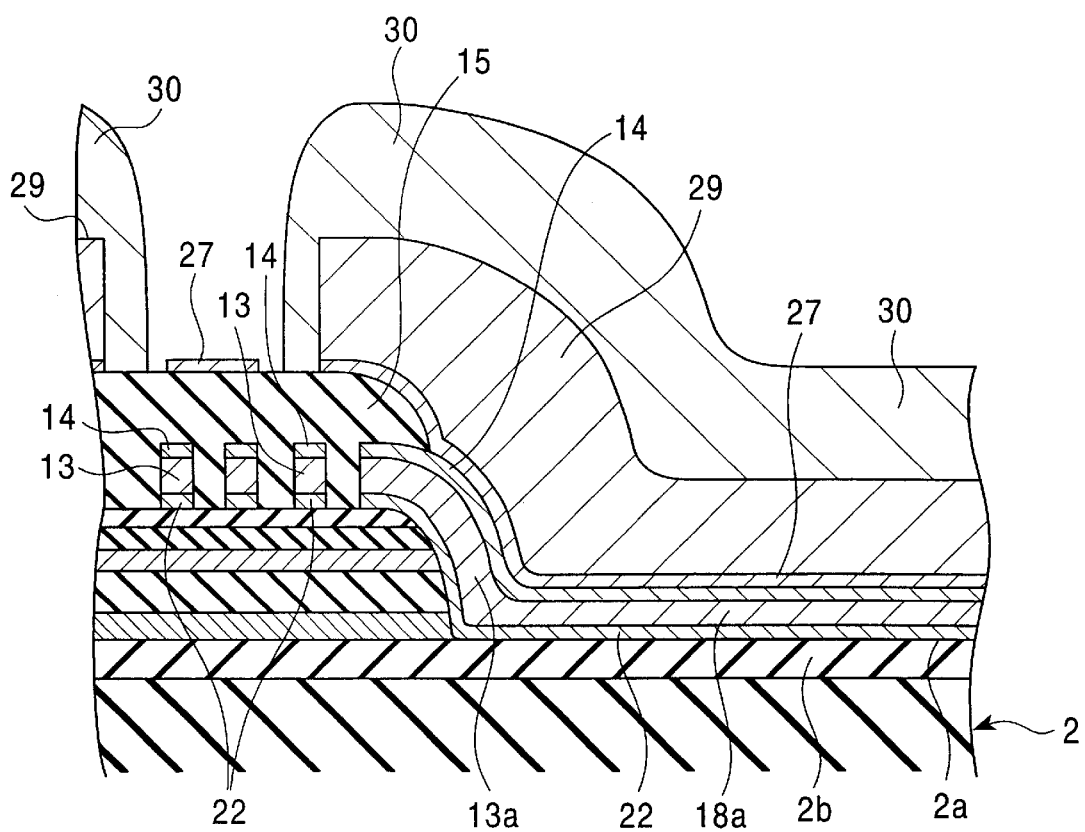
FIG. 12 is a schematic diagram which shows a method of producing the thin-film magnetic head of the present invention.

In an upper core wet etching step shown in FIG. 12, while the permalloy plating film 29 is covered with a resist film 30 in the portions corresponding to the upper core 16, the protective films 21a and 21b covering the leader sections 18a and 18b, and the terminals 19a and 19b, the other unnecessary permalloy plating film 29 is removed, and thus, the upper core 16, the protective films 21a and 21b, and terminals 19a an 19b are formed. At this stage, since the leader sections 18a and 18b are protected by the resist film 30 on the surface of the permalloy plating film 29 (protective films 21a and 21b), the leader sections 18a and 18b are not brought into contact with a wet etchant and are not eroded.

Figure 13:
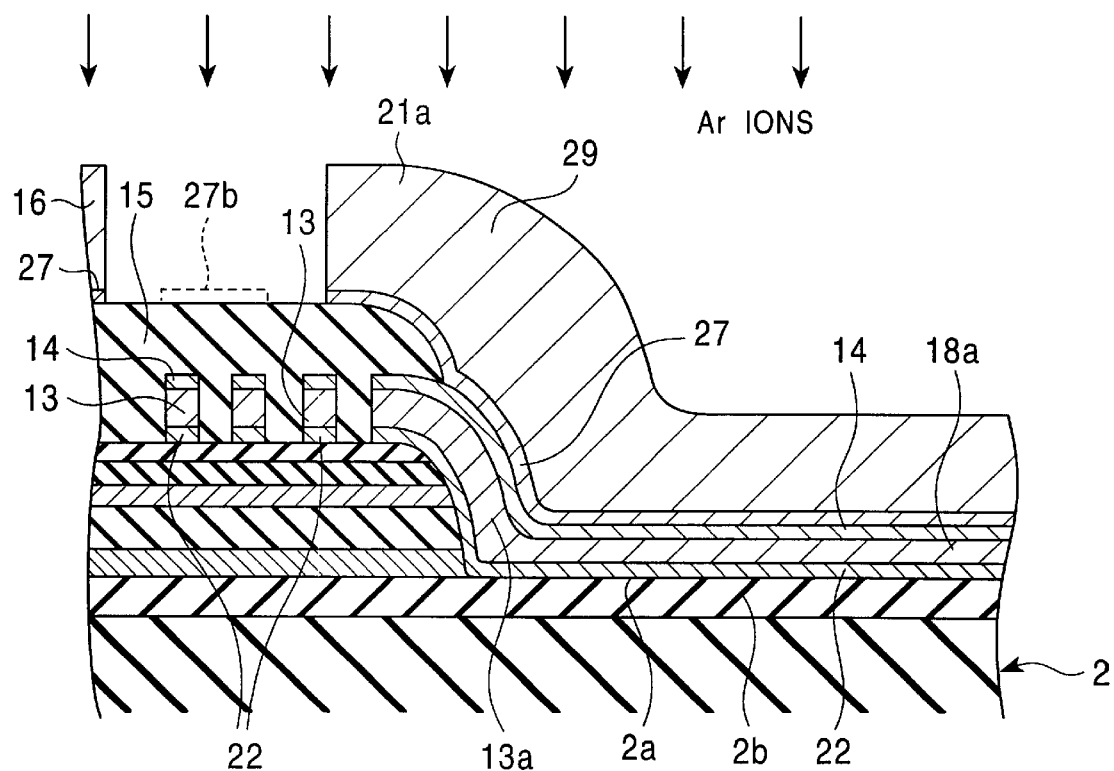
FIG. 13 is a schematic diagram which shows a method of producing the thin-film magnetic head of the present invention.

Next, in a fourth ion milling shown in FIG. 13, after the resist film 30 is stripped, the surface of the side 2a of the slider 2, the surface of the second insulating layer 15, the surfaces of the protective films 21a and 21b and terminals 19a and 19b, and the surface of an unnecessary underlying layer 27b exposed by the second wet etching are irradiated with Ar ions, and the exposed unnecessary underlying layer 27b is eliminated.

At this stage, since the leader sections 18a and 18b are covered with the protective films 21a and 21b, respectively, the leader sections 18a and 18b are not eliminated by the ion milling.

Figure 14:
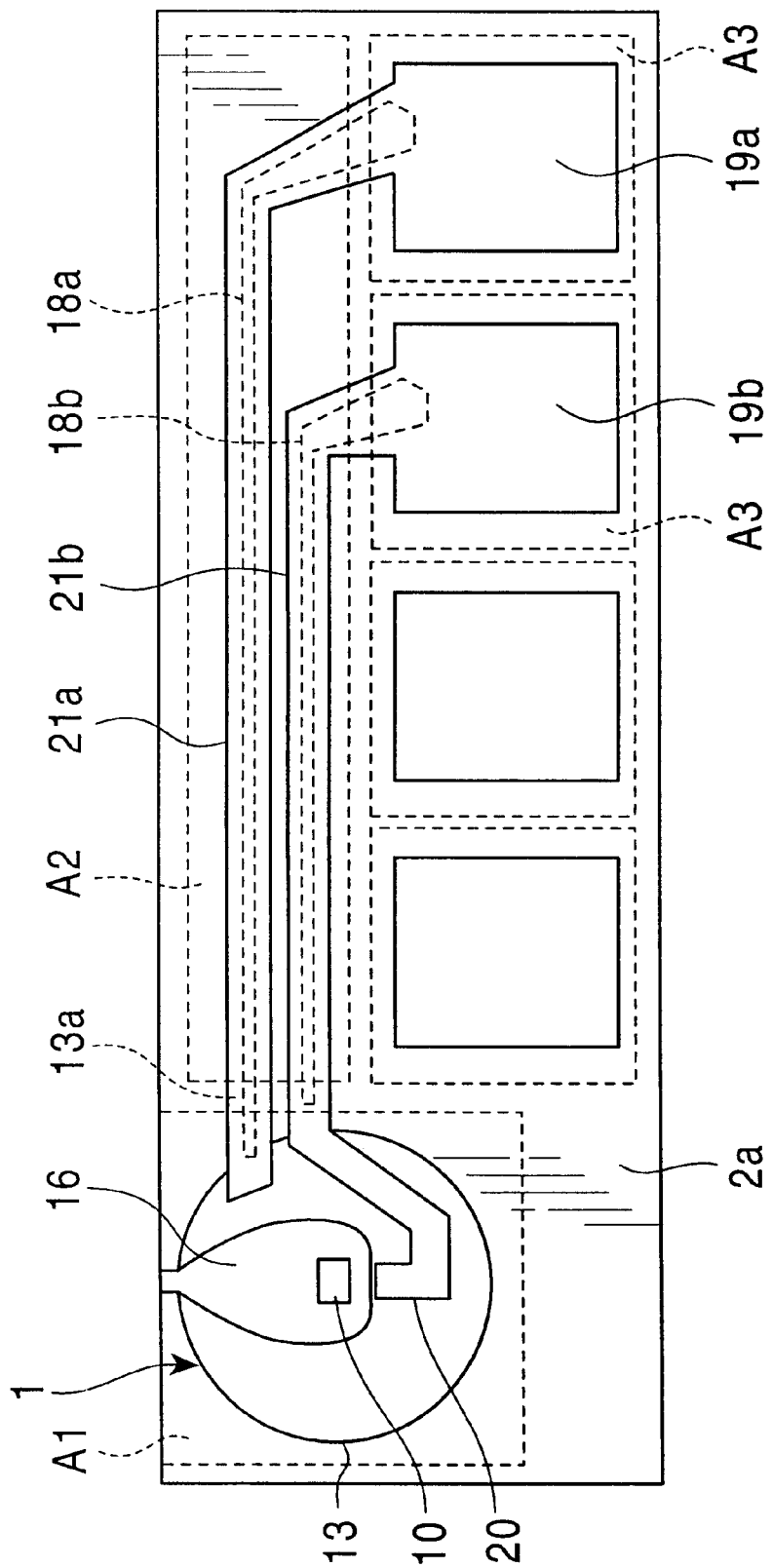
FIG. 14 is a schematic diagram which shows a method of producing the thin-film magnetic head of the present invention.
Figure 15:
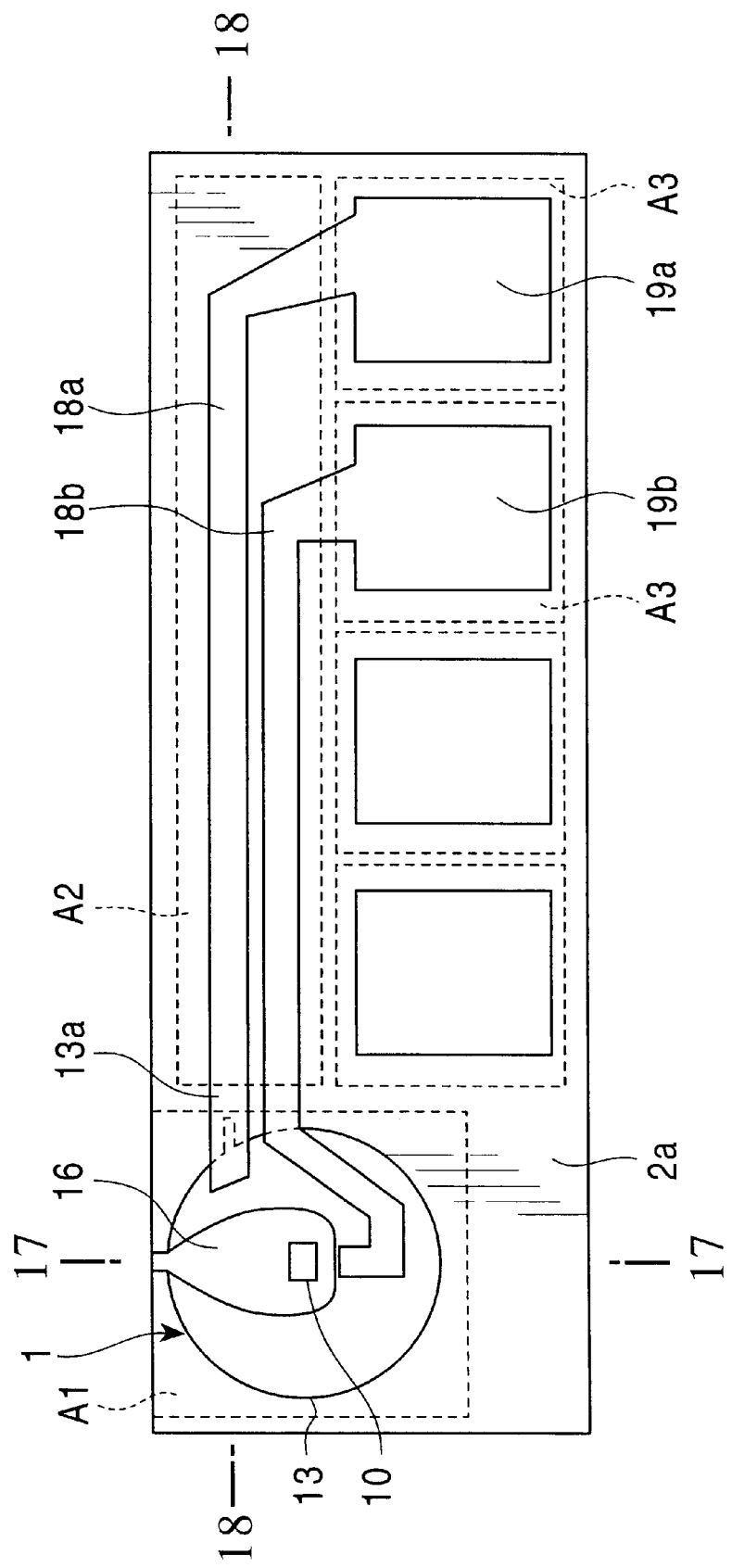
FIG. 15 is a plan view of a side of a slider provided with a conventional thin-film magnetic head.
Figure 16:
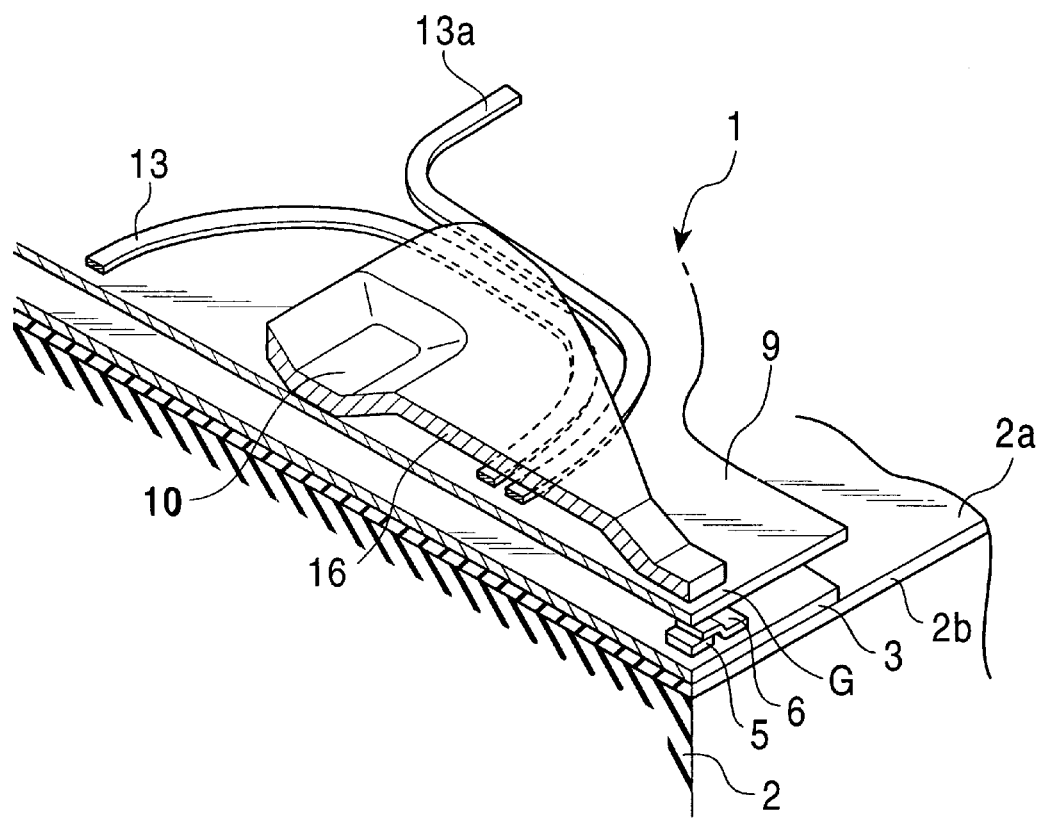
FIG. 16 is a perspective view of a head element of the conventional thin-film magnetic head.
Figure 17:
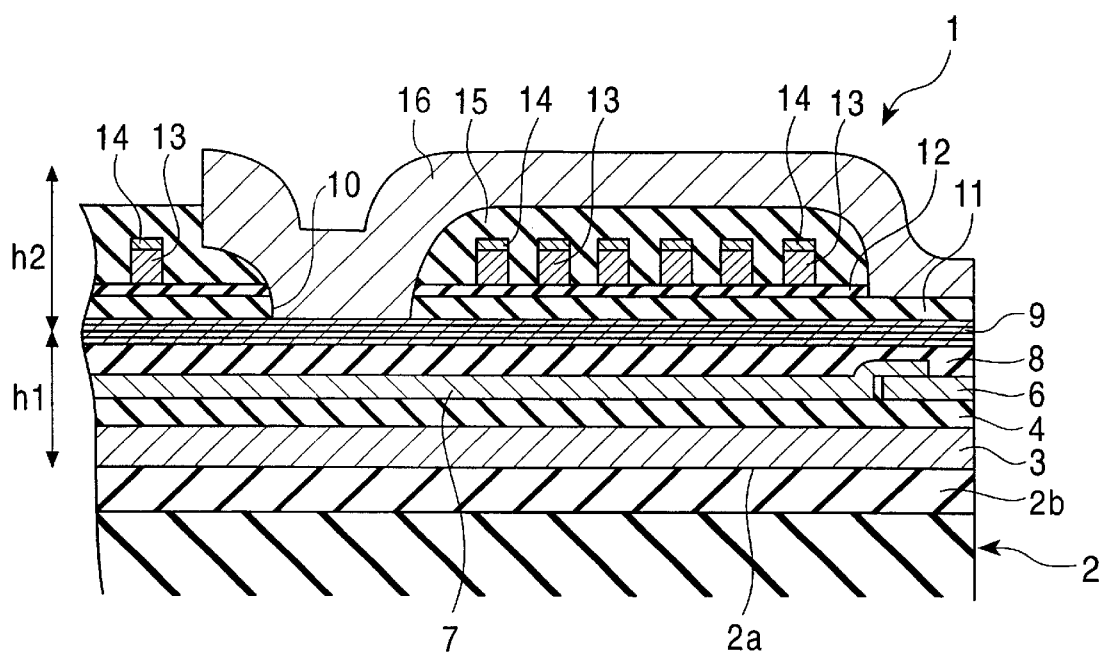
FIG. 17 is a portion of a sectional view taken along the line 17—17 of FIG. 15.
Figure 18:
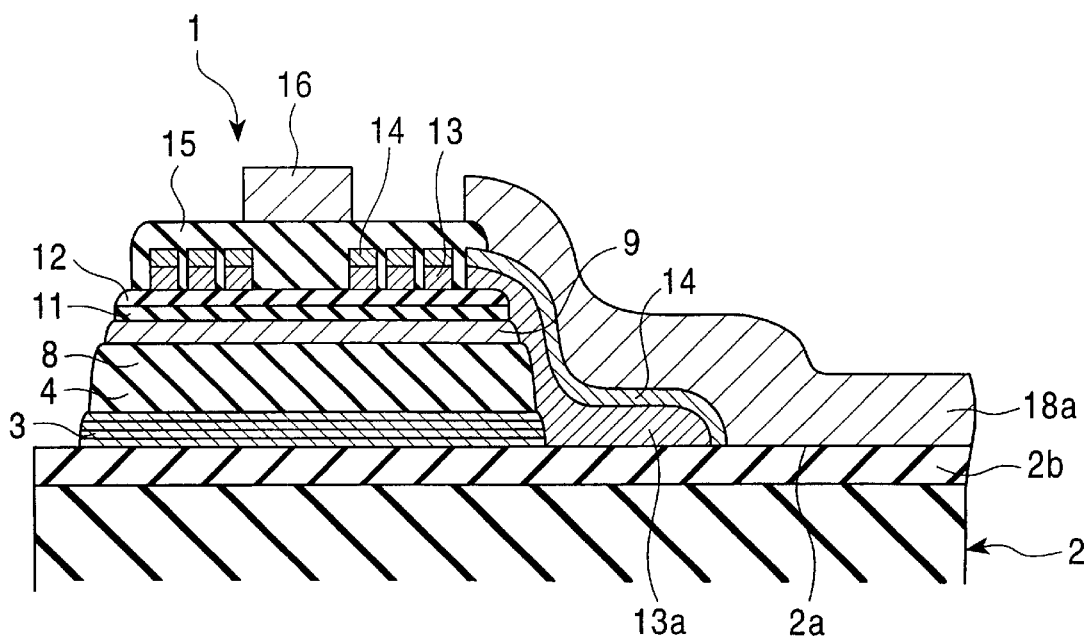
FIG. 18 is a portion of a sectional view taken along the line 18—18 of FIG. 15.
Figure 19:
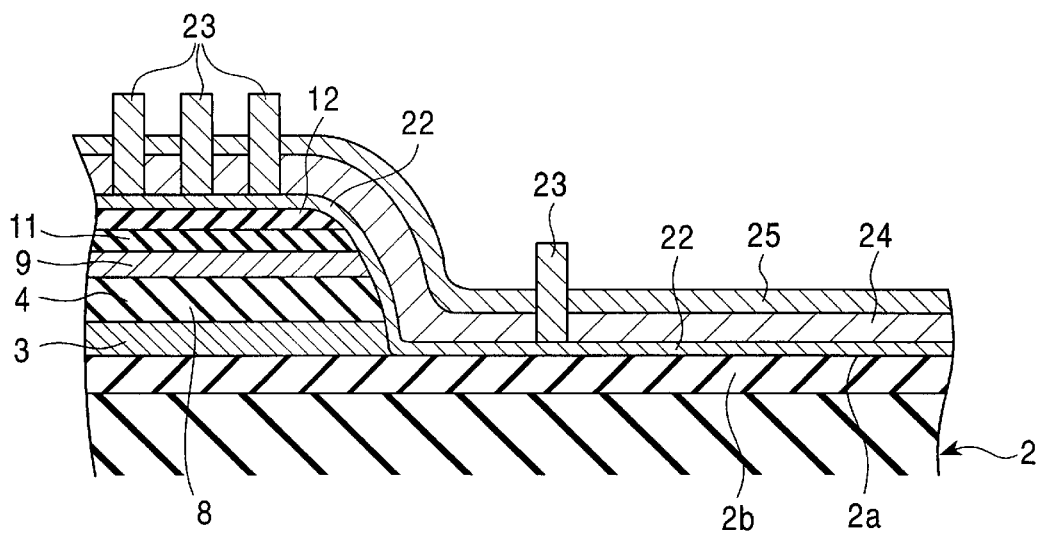
FIG. 19 is a schematic diagram which shows a method of producing the conventional thin-film magnetic head.
Figure 20:
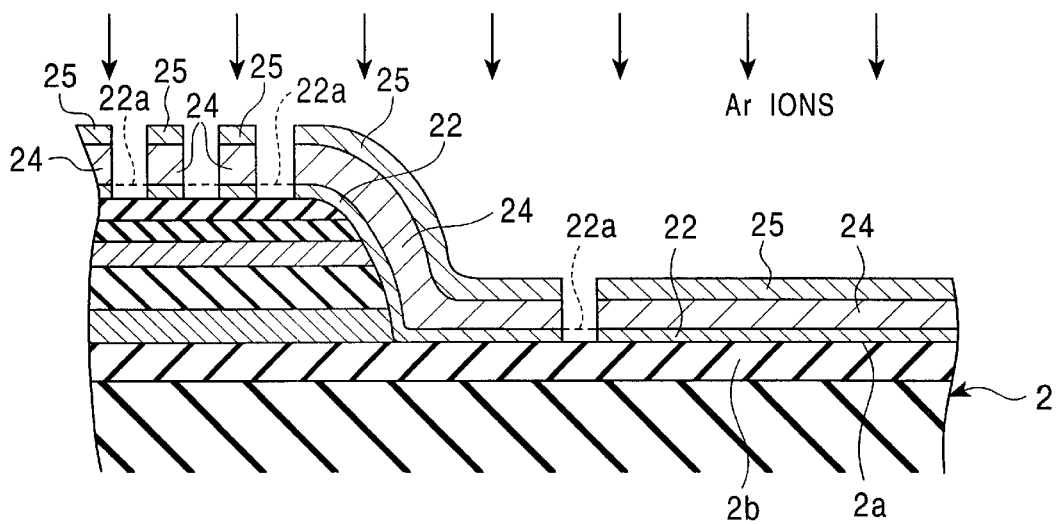
FIG. 20 is a schematic diagram which shows a method of producing the conventional thin-film magnetic head.
Figure 21:
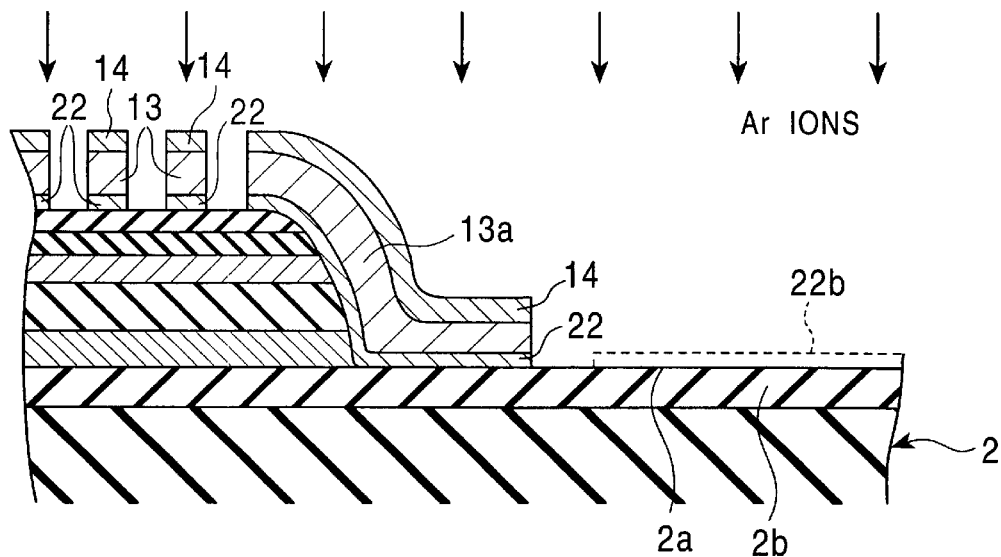
FIG. 21 is a schematic diagram which shows a method of producing the conventional thin-film magnetic head.
Figure 22:
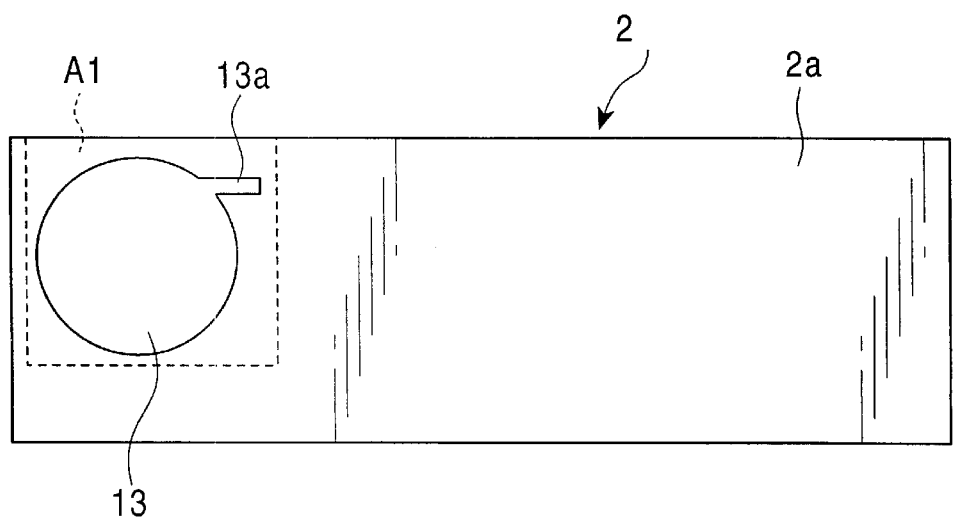
FIG. 22 is a schematic diagram which shows a method of producing the conventional thin-film magnetic head.
Figure 23:
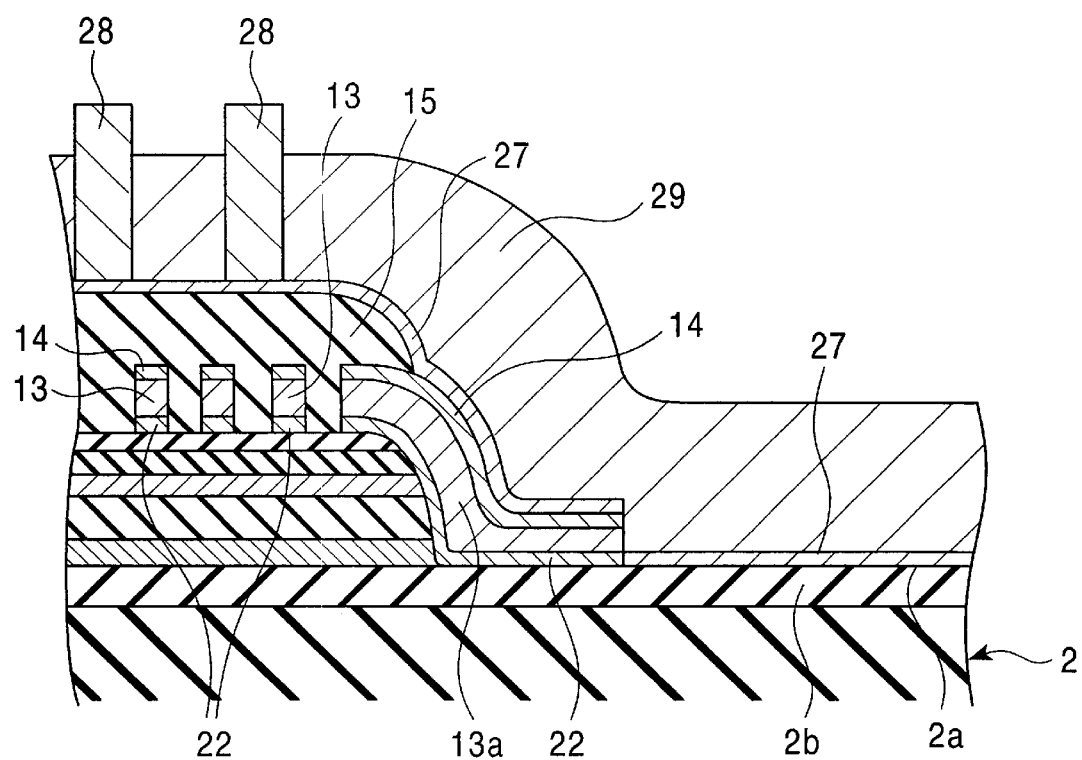
FIG. 23 is a schematic diagram which shows a method of producing the conventional thin-film magnetic head.
Figure 24:
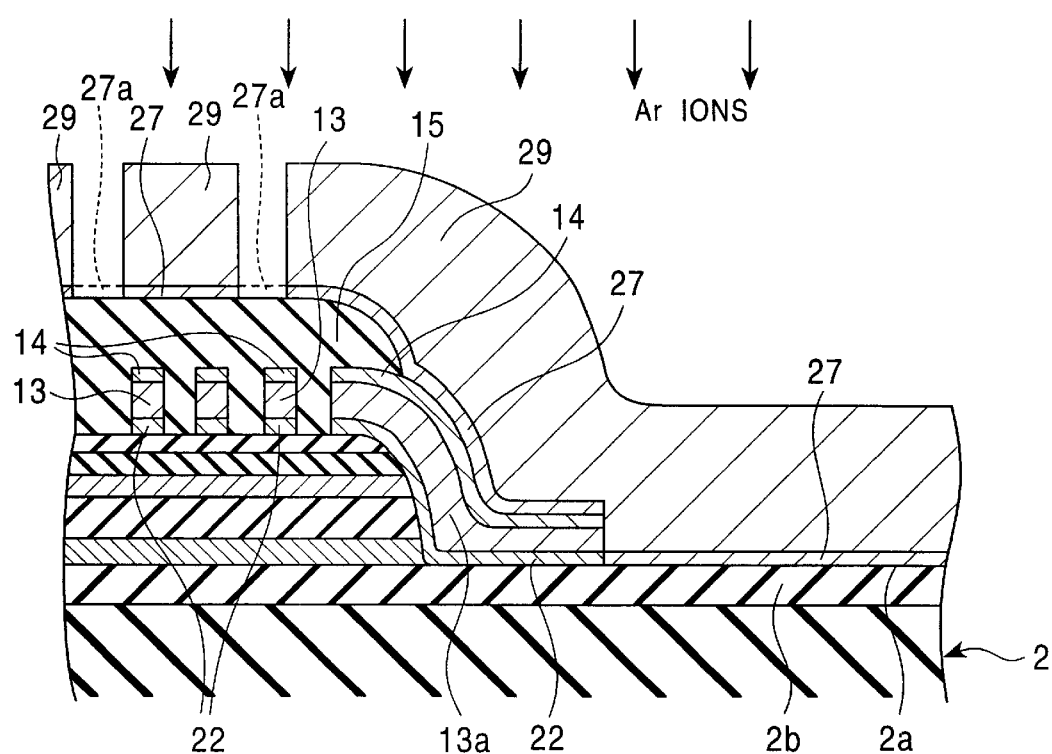
FIG. 24 is a schematic diagram which shows a method of producing the conventional thin-film magnetic head.
Figure 25:
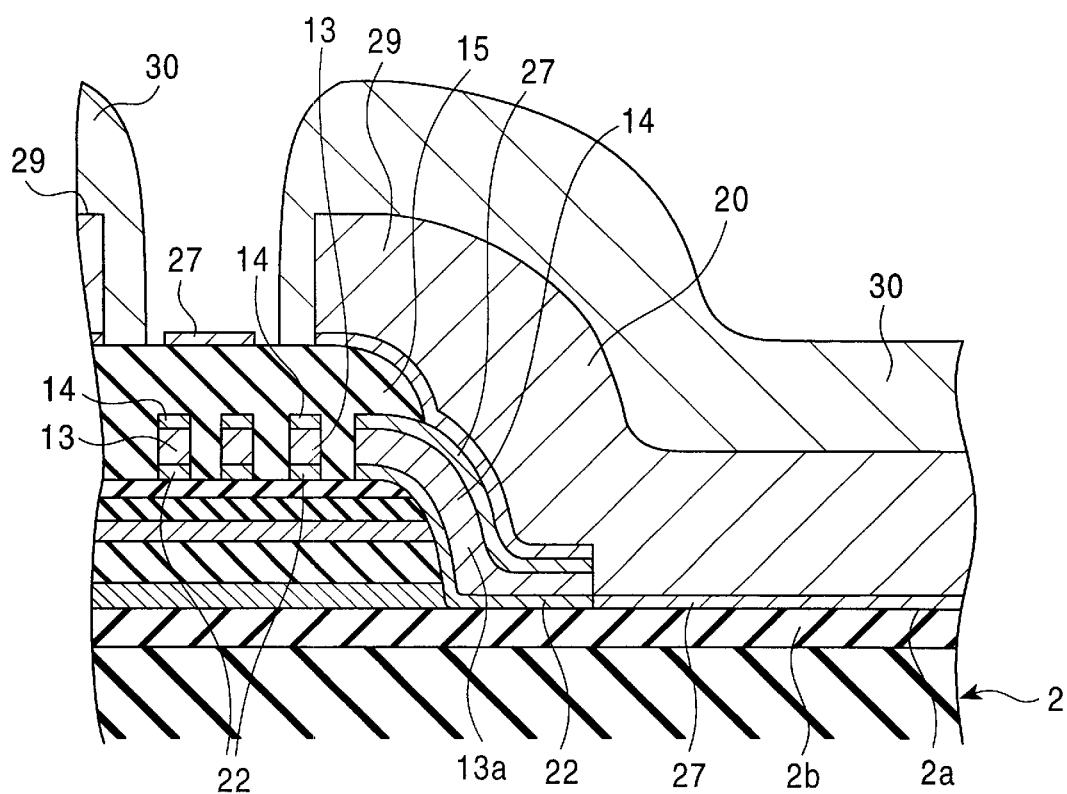
FIG. 25 is a schematic diagram which shows a method of producing the conventional thin-film magnetic head.
Figure 26:
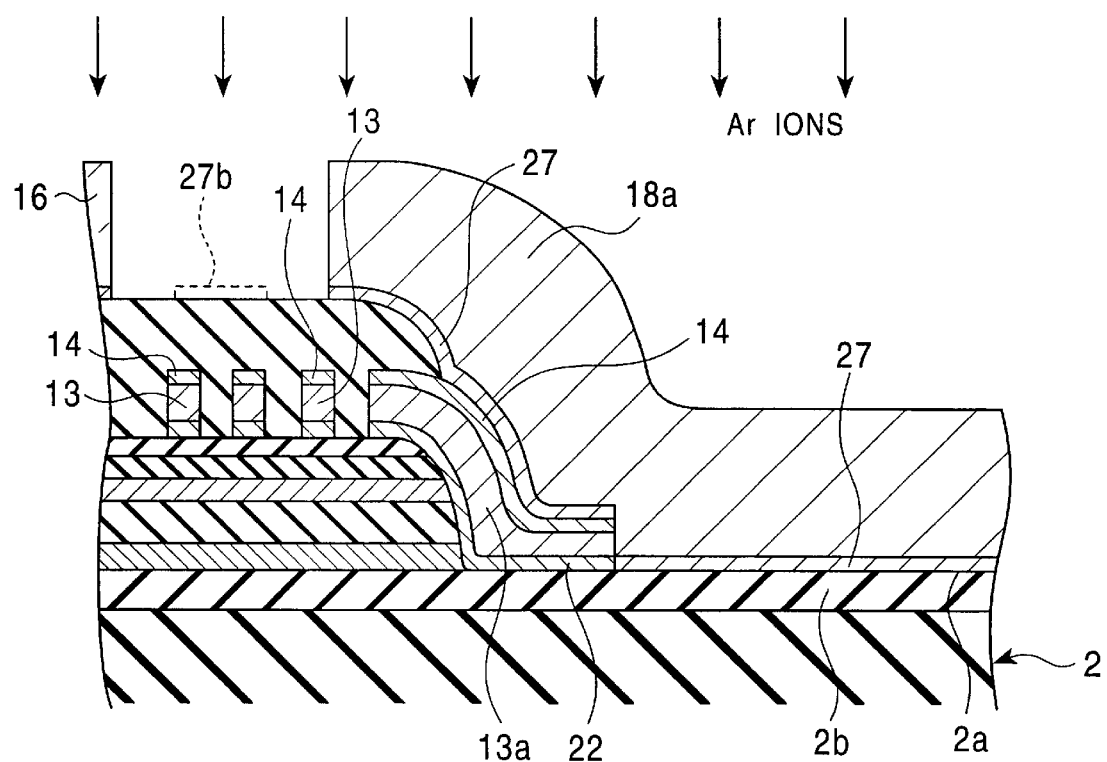
FIG. 26 is a schematic diagram which shows a method of producing the conventional thin-film magnetic head.
Figure 27:
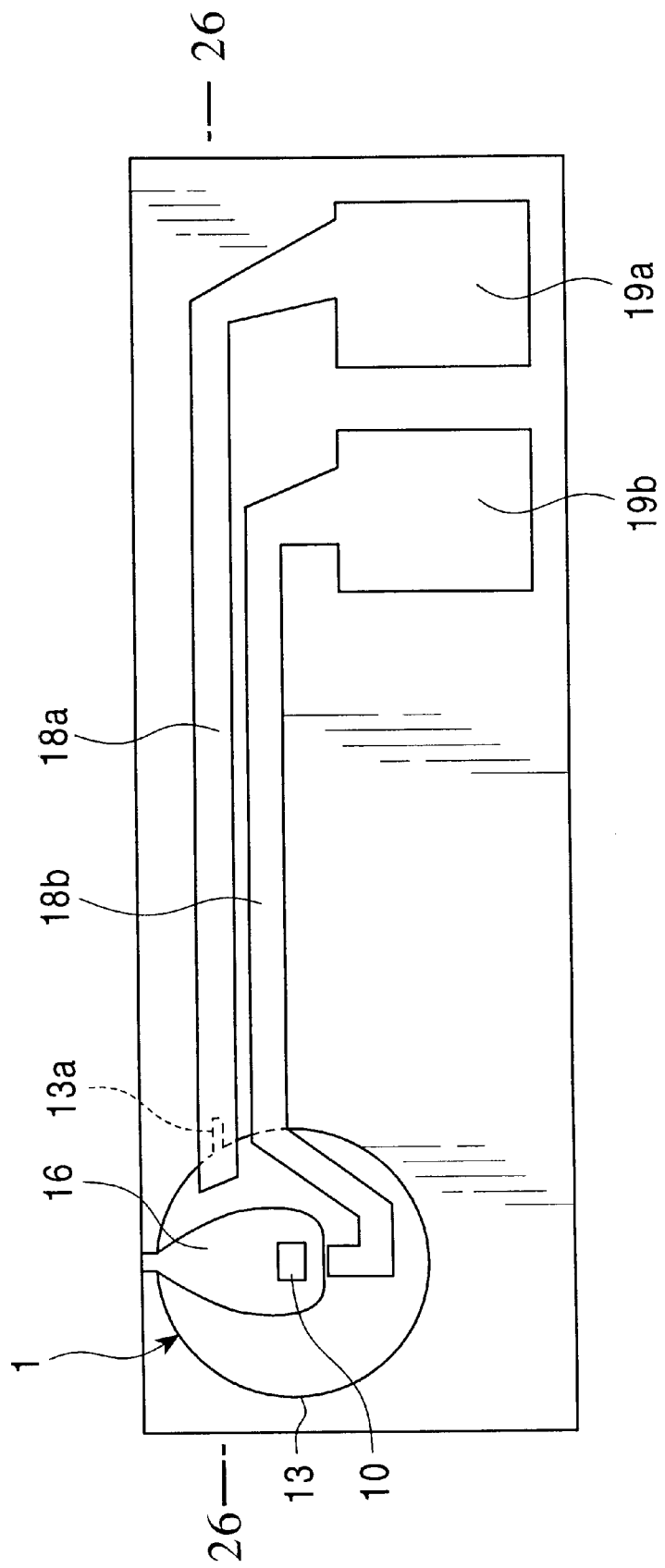
FIG. 27 is a schematic diagram which shows a method of producing the conventional thin-film magnetic head.

FIG. 14 shows a structure in which the coil 13, the upper core 16, the leader sections 18a and 18b, the protective films 21a and 21b, and the terminals 19a and 19b are completed.

In the example described above, although the first leader section 18a and the coil 13 are integrally formed, the first leader section 18a may extend from the vicinity of the coil 13 to the terminal region A3 and the first protective film 21a covering the first leader section 18a may be connected to the end 13a of the coil 13 so that the coil 13 and the first leader section 18a are electrically connected to each other.

A thin-film magnetic head of the present invention includes a coil composed of a good conductor, an upper core composed of a magnetic material, a first leader section which is connected to an end of the coil and extends to a terminal region, and a protective film composed of a magnetic material covering the first leader section, the first leader section being composed of a good conductor. Thereby, the thin-film magnetic head has a lower wiring resistance in comparison with a conventional thin-film magnetic head in which a leader section is composed of a magnetic material, thus decreasing power consumption.

The thin-film magnetic head may further include a second leader section extending from the vicinity of the coil to the terminal region and a protective film which covers the second leader section and which is connected to the other end of the coil and connects the coil and the second leader section, the second leader section being composed of a good conductor. Thereby, the thin-film magnetic head has a lower wiring resistance in comparison with a conventional thin-film magnetic head in which a leader section is composed of a magnetic material, thus decreasing power consumption.

Since the leader section is composed of a good conductor, and the surface of the leader section is covered by the protective film, it is not required to use a permalloy having a low resistivity, in which the Ni content is higher than the Fe content, as a material for the upper core because the leader section is composed of the same material as that for the upper core as in the conventional thin-film magnetic head. Therefore, the upper core may be composed of a permalloy having a high resistivity, such as an alloy in which the Fe content is higher than the Ni content, without considering the conductivity of the leader section. Thus, the eddy current loss is decreased in the thin-film magnetic device operated at high frequencies, enabling a decrease in power consumption.

The alloy in which the Fe content is higher than the Ni content has a higher saturation magnetic flux density in comparison with the alloy in which the Ni content is higher than the Fe content. Thus, a thin-film magnetic head having high recording density can be provided.

A thin-film magnetic head of the present invention includes a coil composed of a good conductor, an upper core composed of a magnetic material, a leader section extending from the vicinity of the coil to a terminal region, and a protective film which covers the surface of the leader section and which connects the coil to the leader section. The leader section is composed of a good conductor. Thereby, the thin-film magnetic head has a lower wiring resistance in comparison with a conventional thin-film magnetic head in which a leader section is composed of a magnetic material, thus decreasing power consumption.

In accordance with a method of producing a thin-film magnetic head of the present invention, by integrally forming a coil and a leader section using a good conductor, it is possible to provide a thin-film magnetic head in which power consumption is decreased without increasing the number of fabrication steps in comparison with the conventional method.

Since a protective film for covering the leader section is formed using a magnetic material in the step for integrally forming the upper core and the protective film, the leader section is not damaged in the ion milling and wet etching steps during the fabrication of the upper core. It is possible to provide a reliable thin-film magnetic head in which power consumption is decreased and which does not have a connection defect due to damage of the leader section without increasing the number of fabrication steps in comparison with the conventional method.

What is claimed is:

1. A thin-film magnetic head comprising:

a magnetic lower core provided on a slider;

a first insulating layer formed on the lower core;

a spiral coil comprising a good conductor formed on the first insulating layer;

a leader section comprising a good conductor formed on the slider, the leader section extending from an end of the coil to a terminal region provided on the slider;

a second insulating layer formed on the first insulating layer so as to cover the coil;

a magnetic upper core formed on the second insulating layer, the upper core being in contact with the lower core at an inner center of the coil; and a protective magnetic film comprising a magnetic alloy having an outer shape corresponding to an outer shape of the leader section and covering an entire surface of the leader section, wherein the leader section comprises a first leader section comprising a good conductor connected to the end of the coil and extending to a first terminal region provided on the slider and a second leader section comprising a good conductor extending from the other end of the coil to a second terminal region provided on the slider, and the protective film comprising a first protective film and a second protective magnetic film having an outer shape corresponding to an outer shape of the first leader section and the second leader section, respectively, and covering the entire surface of the leader section.

2. A thin-film magnetic head according to claim 1, wherein the leader section comprises copper.

3. A thin-film magnetic head according to claim 1, wherein the upper core comprises an alloy containing at least one element selected from the group consisting of Fe, Co, and Ni.

4. A thin-film magnetic head according to claim 1, wherein the leader section and the coil are integrally formed.

5. A thin-film magnetic head according to claim 1, wherein the protective film over the leader section and the upper core comprise the same magnetic alloy.

6. A thin-film magnetic head according to claim 5, wherein the upper core and the protective film formed on the surface of the leader section comprise an alloy containing at least one element selected from the group consisting of Fe, Co, and Ni.

7. A thin-film magnetic head according to claim 6, herein the upper core and the protective film formed on the surface of the leader section comprise a FeNi alloy in which the Fe content is higher than the Ni content.

8. A thin-film magnetic head according to claim 6, wherein the upper core and the protective film formed on the surface of the leader section comprise any one of CoFeNi alloys, CoNi alloys, and CoFe alloys, or any one of these alloys in which an inorganic additive or an organic additive is incorporated.

9. A thin-film magnetic head comprising:

a magnetic lower core provided on a slider;

a first insulating layer formed on the lower core;

a spiral coil formed on the first insulating layer;

a first leader section comprising a good conductor connected to an end of the coil and extending to a first terminal region provided on the slider;

a second leader section comprising a good conductor being adjacent to the coil and extending to a second terminal region provided on the slider;

a second insulating layer formed on the first insulating layer so as to cover the coil;

a magnetic upper core formed on the second insulating layer, the upper core being in contact with the lower core at an inner center of the coil;

a first protective magnetic film comprising a magnetic alloy having an outer shape corresponding to an outer shape of the first leader section and covering an entire surface of the first leader section; and a second protective magnetic film comprising a magnetic alloy connected to the other end of the coil, extending from the other end of the coil to the second terminal region along the section leader section, having an outer shape corresponding to an outer shape of the second leader section, and covering an entire surface of the second leader section.

10. A thin-film magnetic head according to claim 9, wherein the first leader section and the second leader section comprises copper.

11. A thin-film magnetic head according to claim 9, wherein the upper core comprises an alloy containing at least one element selected from the group consisting of Fe, Co, and Ni.

12. A thin-film magnetic head according to claim 9, wherein the second protective film over the second leader section and the upper core comprise the same magnetic alloy.

13. A thin-film magnetic head according to claim 9, wherein the first protective film formed on the first leader section comprises an alloy containing at least one element from the group consisting of Fe, Co, and Ni.

14. A thin-film magnetic head according to claim 12, wherein the upper core and the second protective film formed on the surface of the second leader section comprise an alloy containing at least one element selected from the group consisting of Fe, Co, and Ni.

15. A thin-film magnetic head according to claim 14, wherein the upper core and the second protective film formed on the surface of the second leader section comprise a FeNi alloy in which the Fe content is higher than the Ni content.

16. A thin-film magnetic head according to claim 14, wherein the upper core and the second protective film formed on the surface of the leader section comprise any one of CoFeNi alloys, CoNi alloys, and CoFe alloys, or any one of these alloys in which an inorganic additive or an organic additive is incorporated.

* * * * *

UNITED STATES PATENT AND TRADEMARK OFFICE
CERTIFICATE OF CORRECTION

PATENT NO. : 6,487,044 B1
DATED : November 26, 2002
INVENTOR(S) : Kenji Honda

It is certified that error appears in the above-identified patent and that said Letters Patent is hereby corrected as shown below:

<u>Column 11,</u>
Line 50, delete "herein" and substitute -- wherein -- in its place.

Signed and Sealed this

Twentieth Day of May, 2003

JAMES E. ROGAN
*Director of the United States Patent and Trademark Office*